Figure 1:
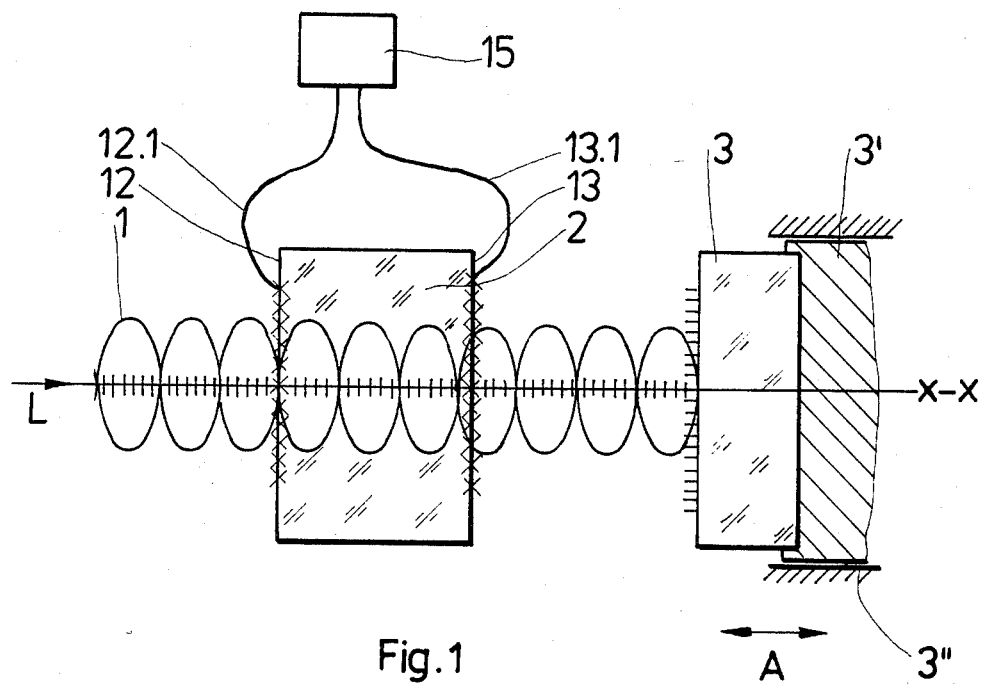

United States Patent [19]

Büchner

[11] Patent Number: 4,571,083
[45] Date of Patent: Feb. 18, 1986

[54] STANDING WAVE INTERFEROMETER FOR MEASURING OPTICAL PATH DIFFERENCES

[76] Inventor: Hans Büchner, 8, Humboldtstrasse, Ilmenau, District of Suhl, German Democratic Rep.

[21] Appl. No.: 468,328

[22] Filed: Feb. 28, 1983

[30] Foreign Application Priority Data

Apr. 5, 1982 [DD] German Democratic Rep. ... 238738

[51] Int. Cl.$^4$ ............................................. G01B 9/02
[52] U.S. Cl. ................................................... 356/358
[58] Field of Search ......................................... 356/358

[56] References Cited

U.S. PATENT DOCUMENTS 4,443,107 4/1984 Alexander et al. .................. 356/373

FOREIGN PATENT DOCUMENTS 1184080 3/1970 United Kingdom ................ 356/358

Primary Examiner—Davis L. Willis
Assistant Examiner—Matthew W. Koren

[57] ABSTRACT

The invention relates to a standing wave interferometer for measuring optical path differences in which a standing wave is produced between a monochromatic light source and a reflector. The displacement of the bulges and nodal points of the standing wave due to displacement of the reflector is sampled by a sampling normal inserted into the standing wave and having two photodetecting layers at a mutual space of $k \cdot \lambda/8$, k being any desired odd integer. The sampling signals are fed into an electronic evaluation unit where these are processed. The measuring object, when having a well-reflecting surface can be the reflector itself, without the necessity of adjusting the same accurately to the incident light beam.

3 Claims, 5 Drawing Figures

STANDING WAVE INTERFEROMETER FOR MEASURING OPTICAL PATH DIFFERENCES

The invention relates to an interferometer which by a standing wave measures the optical path differences obtained from a measured object relative to an object to be measured in optically probing them, particularly for use in all those cases where the technical and physical quantity to be measured effects a variation of the optical path difference, for example, in measuring the quantity length, the refractive index, pressure, the composition of gases, and the quantity of force as far as the effect thereof causes a variation of a geometric dimension of a body.

Measuring object are, but not exclusively, lenses, prisms, reflectors, faces to be tested for smoothness, and other well-reflecting objects.

Interferometer measuring devices are known. In the Patent specification DE No. 1623277 a partial beam directed along a measuring path interferes with another partial beam. In the DE Patent specification No. 1673843 two path lengths are measured by monochromatic light beams the intensity of which is split into a reference beam and a measuring beam in a respective splitting arrangement.

The returning measuring and reference beams are fused in the same splitting arrangement for formation of intensity modulated light beams.

The DE Patent specification No. 1773541 discloses an interferometer in which an electromagnetic bundle of beams produced by a radiation source is split by means of optical members into two spatially separated partial beams which are fused again and impinge upon a radiation sensitive detector which delivers an output signal.

The interferometer arrangements mentioned hereinabove have in common that a splitting layer is provided in the interferometer path of rays which splits the impinging beam into two partial beams, namely the measuring beam and the reference beam, both of which propagate along different path lengths for finally being fused. Thus, the interference patterns are produced by superposition of two radiations propagating in substantially the same direction.

The disadvantages of these interferometer arrangements is the necessity to provide for a reference path of beams. This, on the one hand, prevents to build interferometers of considerably small dimensions and, on the other hand, errors can be involved in the result of an interferometric measurement caused by the reference beam, since in the event of path difference variations one never can find out at the interferometer output whether these are caused by the measuring beam or by the reference beam.

It is an object of the present invention to obviate the above disadvantages.

It is a further object to provide an interferometer arrangement which does without beam paths at right angular mutual relations.

It is still a further object of the invention to provide an interferometer which comprises the measuring path of beams, the non-conventional reference path of beams and the photodetecting means in an integral compact unit.

It is still a further object of the invention to provide an interferometer arrangement of considerably small dimensions determined by the measuring light beam used.

It is still another object of the invention to provide an interferometer arrangement which, due to its simple optical setup and its small dimensions, permits use on measuring objects not accessible to interferometer measurements hitherto.

It is still another object of the invention to provide an interferometer arrangement which even operates when the measuring reflector departs from a right angular position relative to the measuring beam.

These and other objects are realised in an interferometer arrangement of considerably small dimensions and of a simple optical setup, in which a standing wave is produced between a light source emitting monochromatic and coherent light and a measuring reflector.

A scanning normal is arranged between the monochromatic light source and the measuring reflector which is constituted of two plane parallel faces oriented at right angles to the direction of propagation of the standing wave.

The distance between these faces is $k \cdot \lambda/8$ where $k$ is any desired odd integer and $\lambda$ the wavelength of the monochromatic radiation used.

The faces of the normal are provided with photoelectric layers which operate like photoelectric detectors in sampling the bulges and nodal points of the standing wave. Due to the definite distance between these faces two electrical signals result phase shifted by 90° relative to each other which permit registration of the passage of the nodal points and bulges through the faces of the normal with the correct sign by use of an automatic bidirectional counter.

It is known that a phase jump of 180° occurs when a light beam impinges upon a reflecting face.

When the angle of incidence is 90° then two oppositely propagating light beams interfere with each other and a standing wave results. The nodal points of the standing wave are to be found before the reflecting face at spaces of $n \cdot \lambda/2$ where $n$ are all integers and the maxima have distances of $k \cdot \lambda/8$ relative to the reflecting face with $k$ being all odd integers.

Assuming a plane parallel to the reflecting face inserted into the standing wave and displacing this plane in direction of the standing wave then it will subsequently be passed by the nodal points and the maxima of the standing wave and the same occurs when the plane is nondisplaceable and the reflector is displaced in parallel to itself.

Further assuming a second plane in parallel to said first plane which is inserted into the standing wave at a distance of $k \cdot \lambda/8$ between the two planes and displacing the reflector parallel to itself then both planes are subsequently passed by the nodal points and by the maxima of the standing wave, and the procedure of this operation with respect to time involves a phase shift of 90°.

The same is valid when the reflector is nondisplaceable and both planes are displaced parallel to themselves and at a constant distance in direction of the standing wave. When the reflector is directed at right angles to the incident wave the intensity distribution in the planes which are formed by the face of the normal is constant.

However, when the reflector is inclined the wave fronts are reflected including an angle with the incident wave front and a sinoidal periodic intensity distribution results in the plane of the normal.

The amplitudes of the output signals delivered by the detectors of the normal decrease with an increasing angle of inclination, and become zero when the detector integrates one order of the sinoidal periodical intensity distribution.

The Table gives those angles of inclination α of the reflector for which the distance of order in the plane of the detector face equals the diameter of the detector, provided that the photoelectric face is circular and has a diameter a.

| α | ±1'5" | ±2'11" | ±10'52" | ±21'45" | ±1°48' |
|---|---|---|---|---|---|
| a/mm | 1 | 0.5 | 0.1 | 0.05 | 0.01 |

Under these conditions the object to be measured having a well reflecting surface can function as a reflector without adjusting the same accurately to the incident beam.

Figure 2:
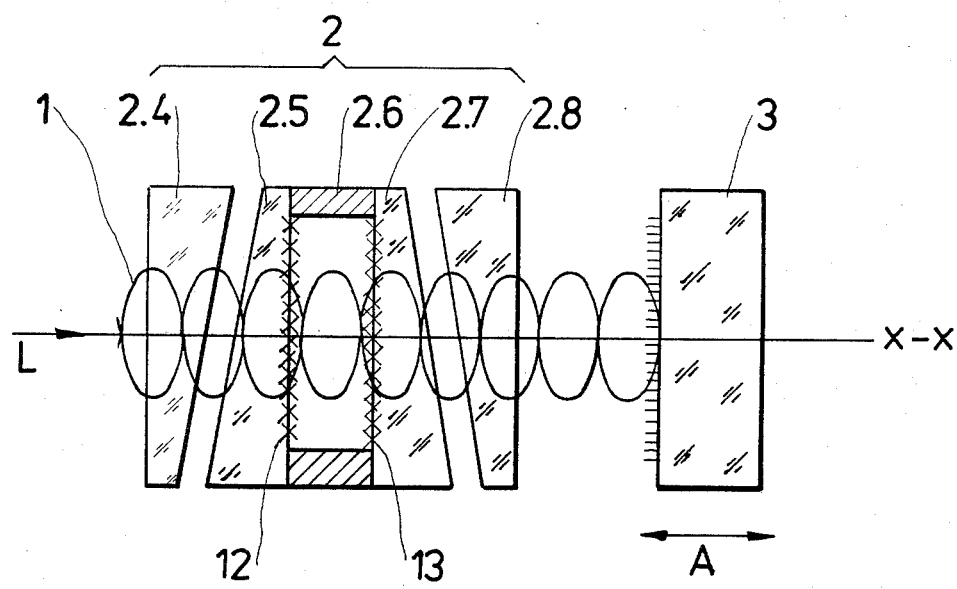
Figure 1A:
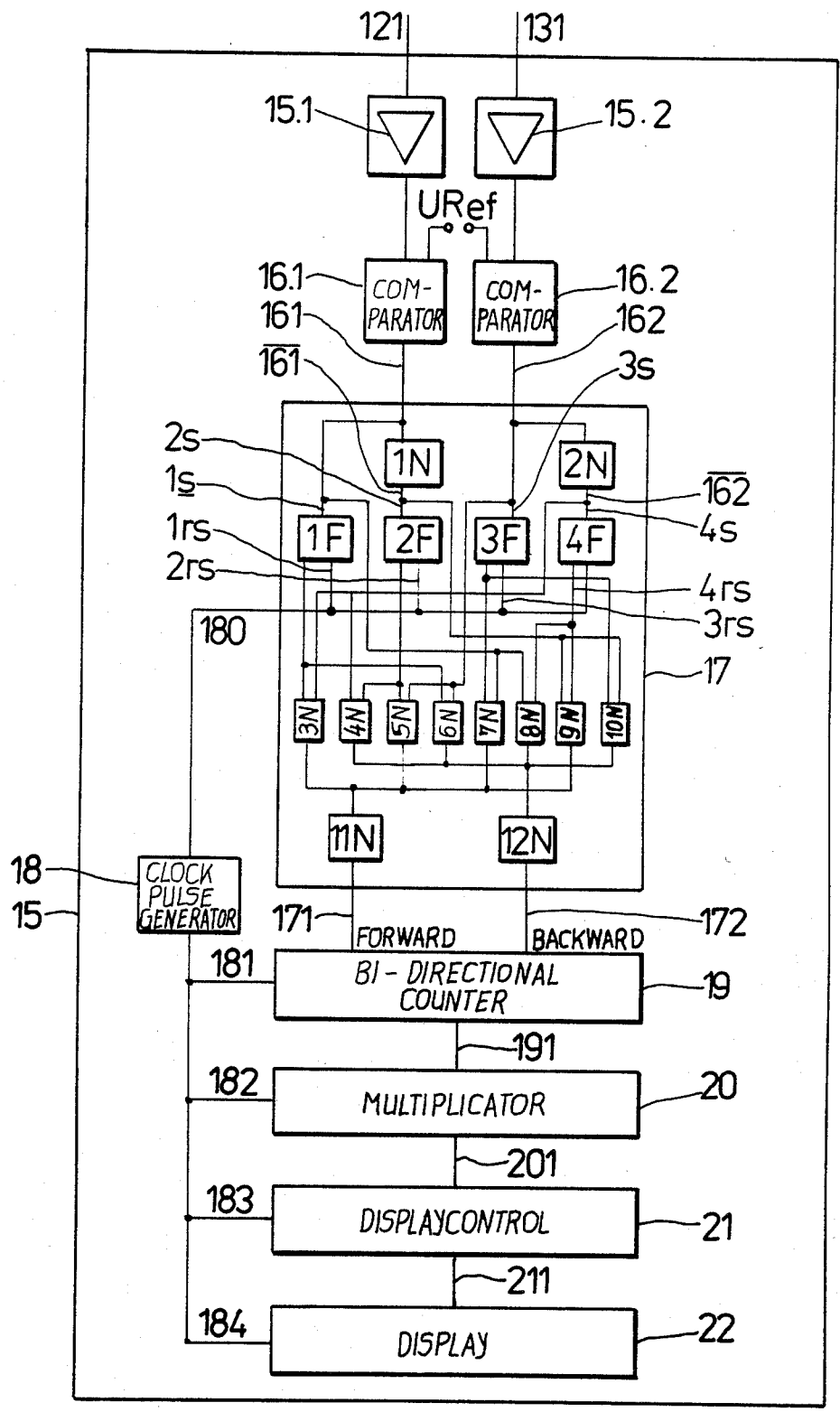
Figure 3:
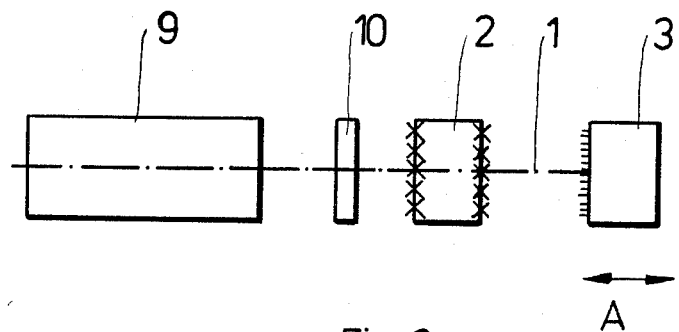
Figure 4:
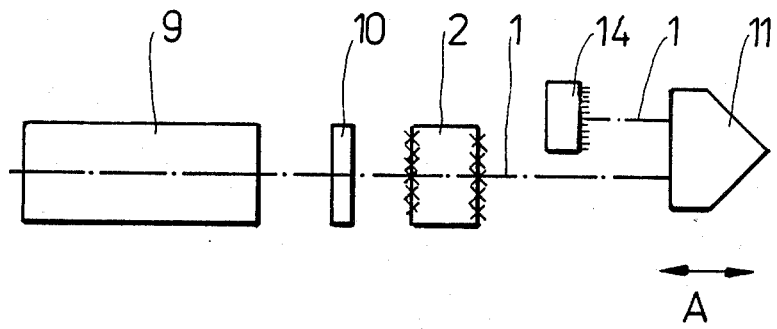

In order that the invention may be more readily understood reference is made to the accompanying drawings which illustrate diagrammatically and by way of Example four embodiments thereof and wherein FIG. 1 shows an interferometer arrangement including a normal, FIG. 1a an electronic evaluation unit for the interferometer, FIG. 2 an alternative of the normal of FIG. 1, and FIGS. 3 and 4 two further embodiments of the standing wave interferometer.

In FIG. 1 an interferometer arrangement comprises about an axis x—x a light source 9 (FIG. 3) emitting a light beam L as a standing wave 1, a normal 2, consisting of a glass plate, and a reflector 3 attached to a sampling head 3' which is displaceable by a means 3" along the directions indicated by a double arrow A. The glass plate 2 has photodetecting layers 12 and 13 at right angles to the axis x—x and in mutual parallel relation, spaced apart by k·λ/8.

The standing wave 1 is produced by the light source 9, which is, for example, a laser, and the reflector 3 and extends along the axis x—x. The photodetecting layers 12, 13 are provided with electric lines 12.1 and 13.1 for connecting said layers 12 and 13 to an electronic evaluation unit 15, shown in more detail in FIG. 1a. The evaluation unit 15 includes two amplifiers 15.1 and 15.2 which are connected via the lines 12.1 and 13.1, respectively, to said photodetecting layers 12 and 13, respectively. The output of the amplifier 15.1 is connected to a first input of a comparator 16.1 and the output of the amplifier 15.2 to the first input of a comparator 16.2.

The second inputs of the comparators 16.1 and 16.2 are connected to a reference voltage source $V_{ref}$ which applies substantially a mean voltage of the standing wave 1 curve to the comparators 16.1 and 16.2.

The comparators 16.1 and 16.2 have outputs 161 and 162 which are connected to the inputs of a logic circuit 17, which comprises a first line of NANDS 1N and 2N connected to the comparator 161 and 162, respectively, outputs, four flip-flops 1F, 2F, 3F, 4F having set inputs 1s, 2s, 3s, 4s, and reset inputs 1rs, 2rs, 3rs, 4rs, the latter are connected to a clock-pulse generator 18.

The set input of the flip-flop 1F is connected to the output 161, the set input of the flip-flop 2F is connected to the output of the NAND 1N, the set input of the flip-flop 3F is connected to the output 162 and the set input of the flip-flop 4F is connected to the output of the NAND 2N. The logic circuit 17 further comprises a second line of NANDS 3N, 4N, 5N, 6N, 7N, 8N, 9N, 10N and a third line of NANDS 11N and 12N.

The output of the flip-flop 1F is connected to the inputs of the NANDS 3N and 6N, the output of the flip-flop 2F is connected to the inputs of the NANDS 4N and 5N, the output of the flip-flop 3F is connected to the inputs of the NANDS 7N and 10N, and the output of the flip-flop 4F is connected to the inputs of the NANDS 9N and 8N.

Furthermore, signal connections are provided between 161 and the NANDS 7N and 8N, between 161 and the NANDS 9N and 10N, between 162 and the NANDS 5N and 6N, and between 162 and the NANDS 3N and 4N. The outputs of the second line of NANDS, namely, of the NANDS 3N, 5N, 7N, and 9N are connected to the input of the NAND 11N, and the outputs of the NANDS 4N, 6N, 8N, and 10N are connected to the input of the NAND 12N. The output 171 of the NAND 11N and the output 172 of the NAND 12N are connected to a bi-directional counter 19 (forward/backward counter).

The latter is connected via a line 181 to the clock-pulse generator 18 and via an output 191 to a multiplier 20 which, in turn, is connected to an LCD logic 21 via an output 201, the logic 21 is connected to a display 22 via a line 211. The lines 182, 183, and 184 apply the clock-pulses from the generator 18 to the multiplier 20, the logic 21, and the display 22, respectively.

In operation, the laser light source 9 (FIG. 3) emits monochromatic and coherent light which is directed substantially along the axis x—x and impinges upon the reflector 3, which is for example, the object to be measured itself, provided that the measuring object has a highly reflective surface. Alternatively, the reflector is attached to the measuring head 3' which contacts the measuring object (not visible) which in turn is secured to a mount (not visible).

The standing wave 1 produced by reflection at the reflector 3 passes the calibrated light transmissive plate (normal) 2. In the position shown in FIG. 1 the standing wave produces in the photodetecting layer 13 of the normal 2 a mean voltage value which is fed into the evaluation unit 15 via the connection line 131. In contrast thereto the standing wave 1 produces a minimum voltage in the photodetecting layer 121 due to the nodal point of the standing wave 1 in the layer 12.

In a following step, the measuring object 3 is replaced for another measuring object (in the case of the reflecting surface object) the thickness of which departs from that of the measuring object 3 by an amount to be measured which corresponds to a displacement of the reflector 3 in direction of the double arrow A.

Alternatively, another measuring object (not visible) is inserted between a not shown mount and the measuring head 3', which, assuming again a departure of thickness of the measuring object from the previous one displaces the measuring reflector 3 along the direction indicated by the double arrow A.

This displacement effects a displacement of the standing wave 1 and, consequently, the bulges and nodal points of the standing wave 1 are displaced relagive to the photodetecting layers 12 and 13.

Assuming a displacement of the reflector 3 along the axis x—x by λ/8 then the standing wave 1 produces a mean voltage value in the layer 12 and a maximum voltage in the layer 13.

The photodetector layers 12 and 13 convert the light energy of the standing wave 1 into two substantially sinoidal voltage curves phase shifted relative to each other by 90°, which curves have double the frequency of the standing wave 1. Both, the 90° phase shift and the frequency doubling is due to the arrangement of the photodetecting layer 12 relative to the photodetecting layer 13 ($k \cdot \lambda/8$). The two sinoidal voltage curves are fed via the lines 12.1 and 13.1, respectively into the amplifiers 15.1 and 15.2, respectively, for amplification. The amplified signals from 15.1 are fed via the first input of the comparator 16.1 into the latter and the amplified signals from 15.2 via the first input of the comparator 16.2 into the latter. Both second inputs of the comparators 16.1 and 16.2 are at a mean voltage level of the sinoidal voltage curve ($V_{ref}$). In dependence on $V_{ref}$ both amplified signals (15.1, 15.2) are converted into square wave pulse sequences (output signals) 161 and 162, respectively, which are also 90° phase shifted relative to each other.

The output signals 161 and 162 are fed into the logic circuit 17, that is, into the NANDS 1N and 2N, respectively, where said square wave pulse sequences 161, 162 are negated to yield the output signals $\overline{161}$ and $\overline{162}$. Thus the output signals 161, $\overline{161}$, 162, and $\overline{162}$ are applied to the set inputs of the flip-flops 1F. . . 4F, which effect a four pulse generation (quadruple pulse formation). This is achieved in, for example, setting the flip-flop 1F by a trailing edge of the square wave pulse sequence 161 via the set input 1s, and resetting said flip-flop 1F via the reset input by the clock pulse 180 from the clock-pulse generator 18. Until resetting the flip-flop 1F an output signal is produced.

Subsequently the flip-flops 2F, 3F, 4F are set and reset in the same manner as described in connection with flip-flop 1F. This triggering is performed during a period of $\lambda/2$ of the standing wave 1 so that the output signals from the flip-flops 1F. . . 4F are delivered in steps of $\lambda/8$.

When, for example, the reflector 3 is displaced off from the light source along the axis x—x, the standing wave 1 is displaced by 3 times $\lambda/8$, the first trailing edge which is capable of setting a flip-flop is derived from the photodetecting layer 12, the signal from which is processed as described hereinbefore, and sets the flip-flop 1F via the signal 161, which produces an output signal until reset via the clockpulse 1rs.

The flip-flop 1F output signal is fed into the NANDS 3n and 6n, at the same time the output from the NAND 2n is fed into the NAND 3n, the former having a High-signal due to the signal 162 being at a Low-signal which can easily be understood from the relation of the photodetecting layer 13 to the standing wave 1 which in the displaced (not shown) position delivers a voltage signal which falls short of $V_{ref}$ at the comparator 16.2, and, hence, the output signal 162 from the comparator 16.2 which is a Low-signal is negated in the NAND 2N and yields a High-signal. Thus, the output from the NAND 3N delivers a signal which after negation in the NAND 11N produces a counting pulse which is fed via the forward input 171 into the counter 19. Since a forward displacement is concerned, similar to the operation of the flip-flop 1F the flip-flops 2F, 3F, 4F deliver output signals which are all fed into the NAND 11N and produce counting pulses which are added in the counter 19.

When a "backward" displacement of the reflector 3 is concerned, then the first operable trailing edge is fed into the flip-flop 3F, then 4F, 2F and 1F.

The output signals from the flip-flops 3F, 4F, 2F, 1F are fed into the NAND 12N and from there via the "backward" counting input 172 into the counter 19 where the respective counting operation is performed in dependence on the clock-pulse signals 181.

The counter 19, when receiving pulses via input 171 operates in the mode "addition" and when receiving pulses via the input 172 operates in the mode "subtraction". The "addition" pulses and the "subtraction" pulses, respectively, are fed into the multiplicator 20 via the output 191 where the "addition" pulses and the "subtraction" pulses, respectively, are multiplied by $\lambda/8$.

Controlled by the clock-pulse generator 18 via the clock-pulses 182 the mutliplicator 20 pulses are fed into the display control 21 via the output 201, where the counter "addition" pulses or the counter "subtraction" pulses in dependence on the clock-pulses 183 are converted into signals which, via the output 211, control the display 22 so that the displacements of the reflector 3 are indicated in, for example, nanometers. When the measuring object (not shown) is not identical with the reflector 3, that is, when the measuring object is inserted between the mount (not shown) and the sampling head 3', in a first sampling operation, a normal object is sampled, the resulting signals are processed as described hereinabove, subsequently the counter 19 and the display 22 are zeroed via the control logic 21.

In the following sampling operations the measuring object(s) is/are sampled and the resulting signals processed as described hereinbefore, and the (path) difference to the normal object is displayed in the display 22.

The reflector 3 and the measuring head 3' are seated on means 3" which permit an easy displacement of the former when the (another) measuring object is inserted.

Said means 3" are, for example, sliding tracks in which a table is guided substantially in parallel to the axis x—x.

In FIG. 2 another embodiment of the normal 2 is arranged in the standing wave 1, constituted of two pairs of wedges 2.4 and 2.5 and 2.7 and 2.8, respectively. The optically and partially transmissive photodetecting layers 12 and 13 are disposed on the faces 12.2 of the wedge 2.5 and 13.2 of the wedge 2.7. The faces 12.2 and 13.2 of the wedges 2.5 and 2.7, respectively, include an air space, in this case. The distance between the faces 12.2 and 13.2 is established by the spacer pieces 2.6 (top and bottom pieces), which are so selected to again ensure a $\lambda/8$ relation.

The spacer pieces 2.6 are made, for example, of a material having a low expansion coefficient, such as invar. Due to this setup of the normal 2 it is feasible to obtain a narrow air gap.

Thus departures from the 90° phase difference of the electric output signals due to variations in the spacer pieces 2.6 are substantially eliminated.

Furthermore, the coefficient of expansion of invar is substantially identical to the variation of the wavelength in air due to temperature changes so that also this source of errors is almost eliminated.

FIG. 3 shows an embodiment of the standing wave interferometer of FIG. 1.

The radiation from the monochromatic light source 9, for example, a laser, is reflected in itself at the measuring reflector 3 so that the standing wave 1 is produced between the light source 9 and the measuring reflector 3.

The standing wave 1 with the bulges and the nodal points is only schematically shown.

A λ/4 plate 10 is inserted between the light source 9 and the normal 2 which is made of optically birefringent material. This λ/4 plate 10 produces out of the incident linearly polarized light circularly polarized light which is reflected at the measuring reflector 3 and passes for a second time the λ/4-plate.

The light propagating from the λ/4 plate towards the light source 9 is polarized in a plane displaced by 90° relative to the light originating from the light source 9 so that no feedback effects between the standing wave 1 and the light source 9 are feasible.

FIG. 4 shows a further embodiment of the standing wave interferometer. The monochromatic radiation passes a triple prism 11 non-symmetric relative to the incident beam. Thus, the beam is displaced laterally and parallel to itself and impinges upon a reflector 14 which produces the standing wave 1.

When the triple prism 11 is moved the standing wave 1 twice passes the path of displacement so that the path of displacement is to be related to λ/16 when the quadruple pulse formation is carried out.

The λ/4 plate 10 obviates feed back effects between the standing wave 1 and the light source 9.

The invention is not restricted to the above embodiments. Thus, the geometry of the normal 2, the reflector 3 and the sensing head 3' can be of circular cross-section (considered at right angles to the axis x—x).

In this case the components mentioned are mounted in a tubular housing in which the displaceable components (reflector 3, sensing head 3', means 3") are slidingly arranged by balls.

Furthermore, it is feasible to have the reflector 3 stationary and to the displace the sensing head 3' in common with the normal 2.

I claim:

1. A standing wave interferometer for measuring optical path differences between a first object measured and further objects to be measured,
    comprising in optical alignment and about an optical axis a light source for emitting coherent and monochromatic light,
    a reflector in spaced relation to said light source,
        said reflector having a reflecting face and a rear face,
        said reflecting face being substantially at right angles to said axis in opposition to said light source,
    a measuring head attached to said rear face of said reflector,
    an object to be measured being in close at least pointwise contact to said measuring head,
    means for displacing said measuring head and
        said reflector in parallel to the reflecting face along said optical axis,
        said light source and said reflector being for producing a standing wave from said monochromatic and coherent light,
    a first pair of wedges and
    a second pair of wedges being inserted via their effective faces into said standing wave between said light source and said reflector and being symmetrical relative to said optical axis,
        adjacent faces of the opposing individual wedges being parallel to one another,
        said first pair of wedges and said second pair of wedges including an air space being closed by a top spacer and a bottom spacer, the opposing wedge faces forming said air space having each a substantially transmissive photodetecting layer substantially in parallel to said reflecting face and at a definite mutual relation defined by the wavelength of said standing wave for producing sine voltages from said standing wave portions contacting each of said photodetecting layers,
        said photodetecting layers being each provided with electric lines,
    means for inhibiting feed back of said standing wave to said light source,
    and an electronic evaluation unit for evaluating said sine voltages, in converting the latter into units of length,
        said evaluation unit being connected to each of said photodetecting layers via said electric lines.

2. A standing wave interferometer as claimed in claim 1, wherein said electronic evaluation unit is constituted of two amplifiers being connected to said one photodetecting layer and to the other photodetecting layer, respectively, via the one and the other electric line, respectively,
    a first comparator, having a first and a second input and one output,
    a second comparator, having a first and a second input and one output,
        said first input of said first comparator being connected to the output of the one of said two amplifiers,
        said first input of said second comparator being connected to the output of the other of said two amplifiers,
        the second inputs of said first and said second comparator being connected to a reference voltage,
    a logic circuit having a third input, a fourth input,
    a clock-pulse input, a "forward" output and a "backward" output, a clock-pulse generator,
        said third input being connected to said first comparator output,
        said fourth input being connected to said second comparator output,
        said clock-pulse input being connected to said clock-pulse generator,
    a bi-directional counter having a clock-pulse input,
    a forward counting input, a backward counting input, and an output,
        said counter being connected to the forward/backward outputs of said logic circuit, via the forward/backward counting inputs, and to said clock-pulse generator via said clock-pulse input,
    a multiplier being connected to said bi-directional counter via the counter output,
    a display control logic and a display,
        said display control logic being connected to said multiplier,
        said display being connected to said display control logic,
        said comparator being for converting the sine voltages from said photodetecting layers into square wave pulses in dependence on said reference voltage,
        said logic circuit being for multiplying the square wave pulses from said first and said second comparator and for detecting the forward/backward direction from said square wave pulses,
        said bi-directional counter being for counting the forward and backward square wave pulses, respectively, from said logic circuit in dependence on the clock-pulses from said clock-pulse generator, said multiplier being for multiplying the counter output pulses by a fraction of λ, said display control logic being for converting the multiplied pulse into display control signals, said display being for indicating said display control signals corresponding to said optical path difference in units of length.

3. A standing wave interferometer as claimed in claim 2, wherein said logic circuit includes a first NAND and a second NAND, at least a first, a second, a third and a fourth flip-flop, at least a third, a fourth, a fifth, a sixth, a seventh, an eight, a ninth, and a tenth NAND, an eleventh and a twelfth NAND, each of the flip-flops having a set-input, a reset input and an output, said first NAND, the set input of said first flip-flop and said seventh and eighth NAND being connected to said fourth input of said logic circuit, said fifth input of said logic circuit being connected to the set input of said third flip-flop, to said second NAND and to said fifth and sixth NAND, said first NAND being for negating the square wave pulses from said first comparator, said second NAND being for negating the square wave pulses from said second comparator, said first NAND being connected to the set input of said second flip-flop, and to the ninth and tenth NAND, said second NAND being connected to the set input of said fourth flip-flop, and to said third and fourth NAND, the square wave pulses and negated square wave pulses being for setting said first, second, third and fourth flip-flop, said clock pulse input of said logic circuit being connected to the reset inputs of said first, second, third and fourth flip-flop, the clock pulses from said clock pulse generator being for resetting said first, second, third and fourth flip-flop, the output of said first flip-flop being connected to said third NAND of said second flip-flop to said fourth and fifth NAND of said third flip-flop to said seventh NAND, and of said fourth flip-flop to said eighth and ninth NAND, the outputs of said third, fifth, seventh, and ninth NAND being connected to said eleventh NAND input, the outputs of said fourth, sixth, eighth and tenth NAND being connected to said twelfth NAND input, said eleventh NAND output being connected to said "forward" output, said twelfth NAND output being connected to said "backward" output.

* * * * *